United States Patent
White (10) Patent No.: US 7,206,159 B2
(45) Date of Patent: Apr. 17, 2007

(54) METHOD AND APPARATUS FOR REJECTING CONTACT-INDUCED DISTURBANCES

(75) Inventor: Matthew Taylor White, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/069,734

(22) Filed: Feb. 28, 2005

(65) Prior Publication Data

US 2006/0193075 A1    Aug. 31, 2006

(51) Int. Cl.
    G11B 21/02    (2006.01)
    G11B 5/02     (2006.01)
    G11B 27/36    (2006.01)
(52) U.S. Cl. .............................. 360/75; 360/25; 360/31
(58) Field of Classification Search ...................... None
    See application file for complete search history.

(56) References Cited

U.S. PATENT DOCUMENTS 6,097,559 A * 8/2000 Ottesen et al. ................ 360/31
2003/0011915 A1* 1/2003 Riddering et al. ............ 360/25

OTHER PUBLICATIONS

"Comparison or Four Discrete-Time Repetitive Control Algorithms" Kempf et al. IEEE Control Systems 1993.
"Characterization and Compensation of Disturbances Caused by Head-Disk Contact in Hard Disk Drives" Matthew White, IFAC 2005.

* cited by examiner

Primary Examiner—Andrew L. Sniezek (57) ABSTRACT

A method and apparatus for compensating for head-to-disk contact-induced disturbances in a hard disk drive is disclosed. The method includes determining topographical variations across a surface of a disk during the manufacturing or operation of the hard disk drive. Error signal variations that occur as a result of head-to-disk contact-induced disturbances resulting from the topographical variations are recorded. Current to a voice coil motor in the hard disk drive is varied to correct for the contact-induced disturbances before they occur.

24 Claims, 12 Drawing Sheets

METHOD AND APPARATUS FOR REJECTING CONTACT-INDUCED DISTURBANCES

TECHNICAL FIELD

Embodiments of the present invention relate to the field of hard disk drives, and more particularly to a method for rejecting head-to-disk contact-induced disturbances.

BACKGROUND ART

A primary driving force in the hard disk drive (HDD) industry is the need for greater areal density. Historically, areal density has increased between 30% and 100% annually, through improvements in both track (radial) density and recording (circumferential) density. This increase in areal density has resulted in hard disk drives with significantly higher capacity and has also contributed to dramatic decreases in cost per megabyte.

The most obvious impact of greater areal density on the hard disk drive servo system is the increased performance required to follow data tracks that are shrinking in width. However, another important effect is that as the data bits shrink, the read/write heads must fly closer to the disk surface. Current head-to-disk spacing is approximately 6 nm, compared to approximately 60 nm ten years ago. Because the disk surface is not perfectly flat and the slider fly-height varies, contact can occur between the disk and the slider that contains the read/write heads, causing off-track motion of the read/write heads. For example, if there is a reduction in atmospheric pressure, as might be experienced by a mobile or lap-top computer being used on an airplane, the fly-height can be reduced by a significant percentage, resulting in head-to-disk contact and off-track motion (track misregistration) that can significantly impact read/write operations. In the past, head-disk contact was rare and has been dealt with as isolated events that often caused temporary interruption of the read/write operations. In the future, contact may occur more regularly or perhaps almost constantly, as in the case of contact recording.

Figure 1A:
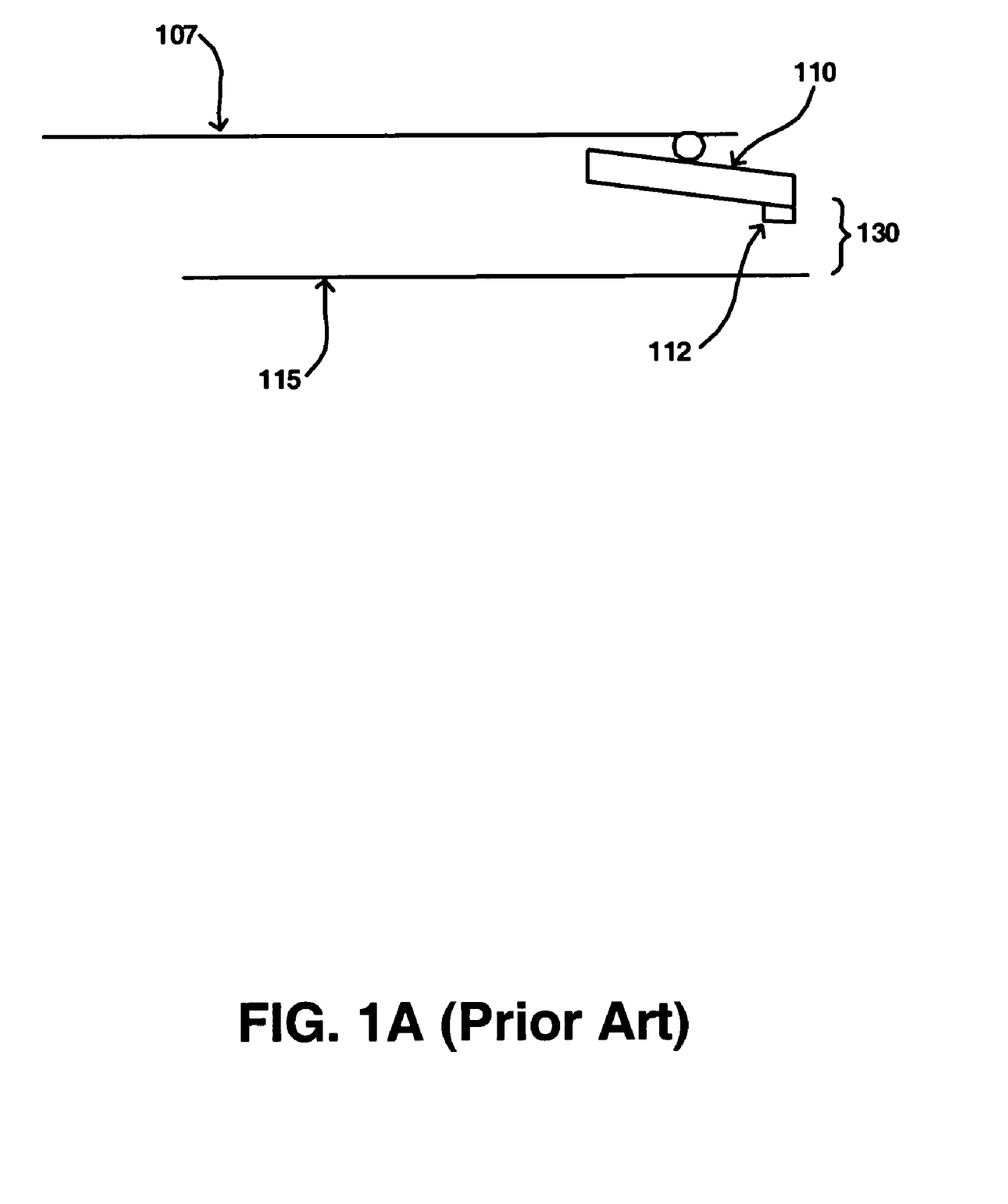

Prior Art FIG. 1A illustrates a slider 110 on a suspension 107 that contains a read/write head 112 flying above an ideal flat disk surface 115 with a fly-height 130. It should be understood that this figure, as well as FIGS. 1B, 1C and 1D, is purely for illustrative purposes and is not intended to be to scale.

Figure 1B:
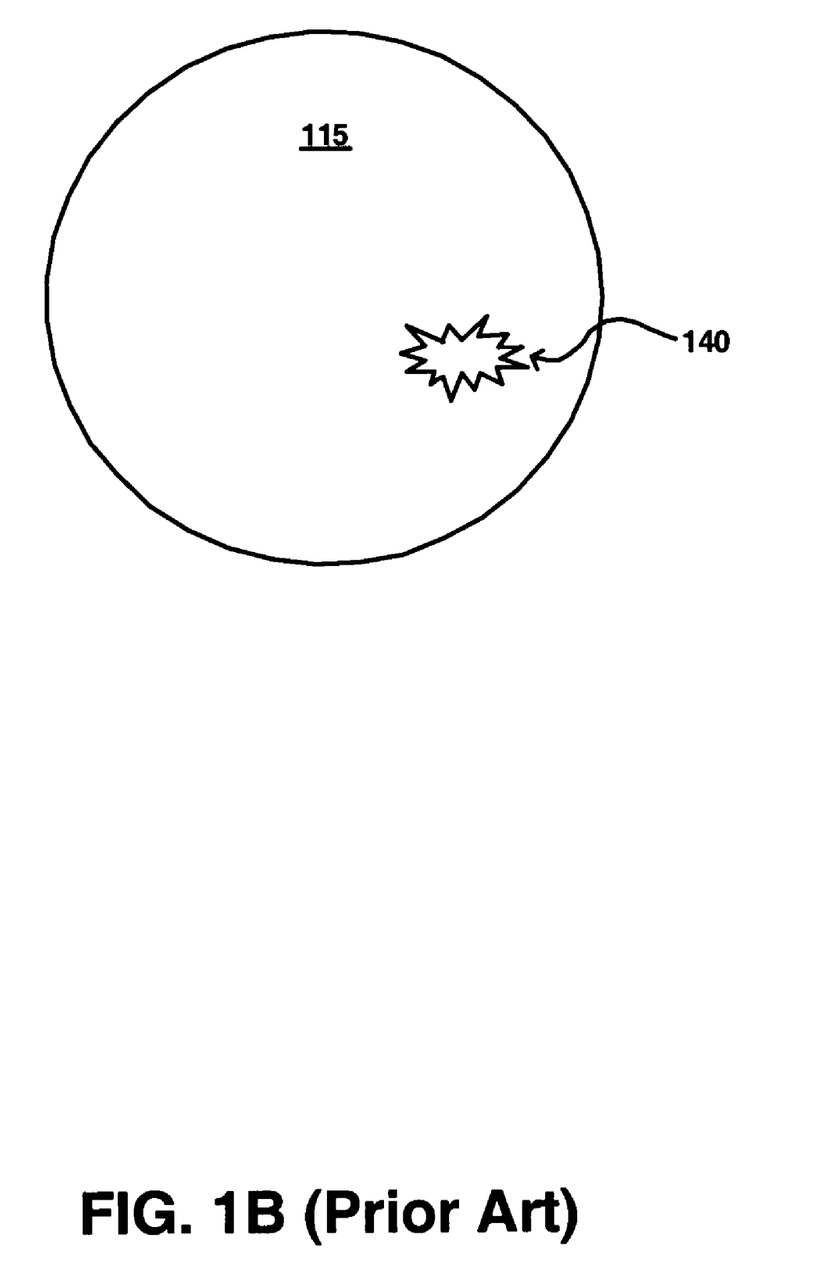

Prior Art FIG. 1B illustrates a disk surface 115 that has a small topographical irregularity 140. Although topographical irregularity 140 is shown as an isolated "bump" or "bubble" on disk surface 115, it could be any number of configurations of disparities, such as, for example, ridges that might result from disk clamping.

Figure 1C:
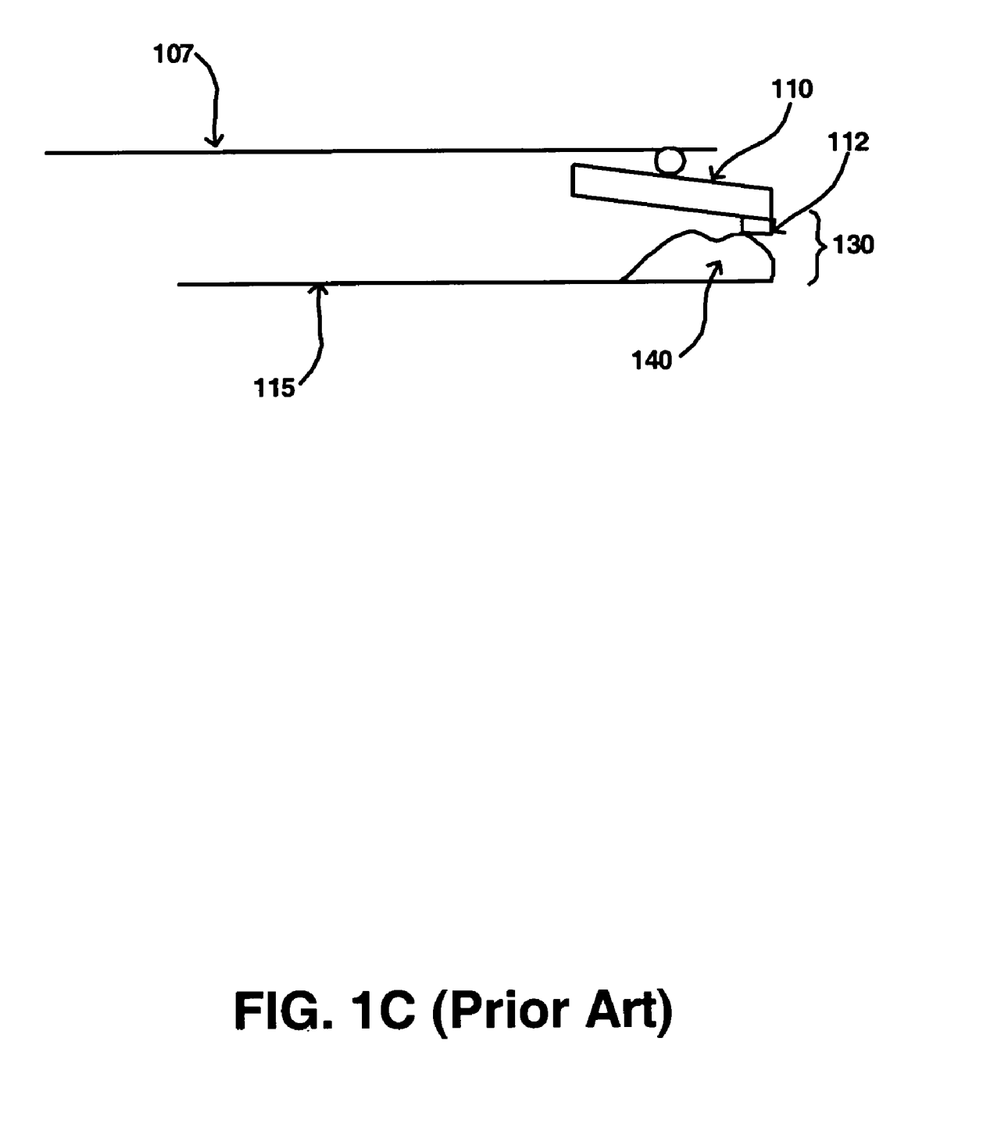

Prior Art FIG. 1C illustrates slider 110 on a suspension 107 containing a read/write head 112 contacting topographical irregularity 140 as fly-height 130 becomes zero.

Figure 1D:
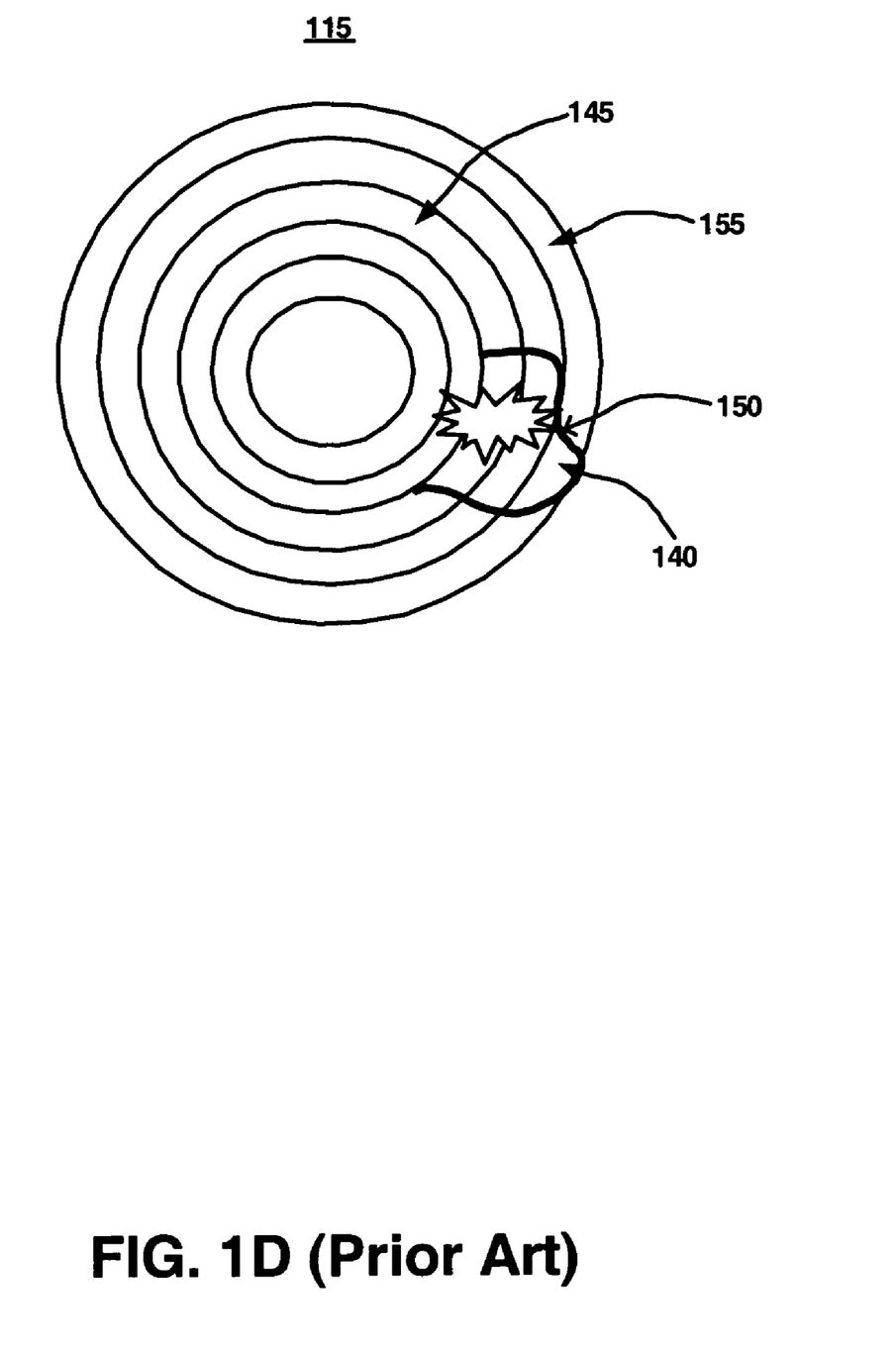

Prior Art FIG. 1D illustrates the off-track writing that might occur when slider 110 containing the read/write head contacts disk surface irregularity 140. If read/write head 112 contained by slider 110 had been writing on track 145, for example, upon contacting topographical irregularity 140 it might jump from track 145 to track 155, as illustrated by path 150.

One of the most common types of repetitive errors, also known as repetitive runout or RRO, occurs when the disk slips in relation to the center of rotation of the spindle motor. This results in errors that typically have their largest amplitude at the first, second, or third harmonics of the spindle rotation speed, which is relatively low in frequency compared to the bandwidth of the feedback control system. The conventional method of compensating for errors encountered repeatedly on a disk is to add a peak filter to the feedback controller at the desired spindle harmonics. This increases the open loop gain at the desired spindle harmonics, which improves the disturbance rejection at these frequencies. Although this technique degrades the disturbance rejection at other frequencies, there is generally an overall improvement in the positioning accuracy. Due to stability requirements, use of peak filters is generally limited to frequencies below the open loop bandwidth of the control system. Feedforward techniques have also been proposed for compensating RRO, but these techniques have also typically been applied to low frequency disturbances.

Figure 2:
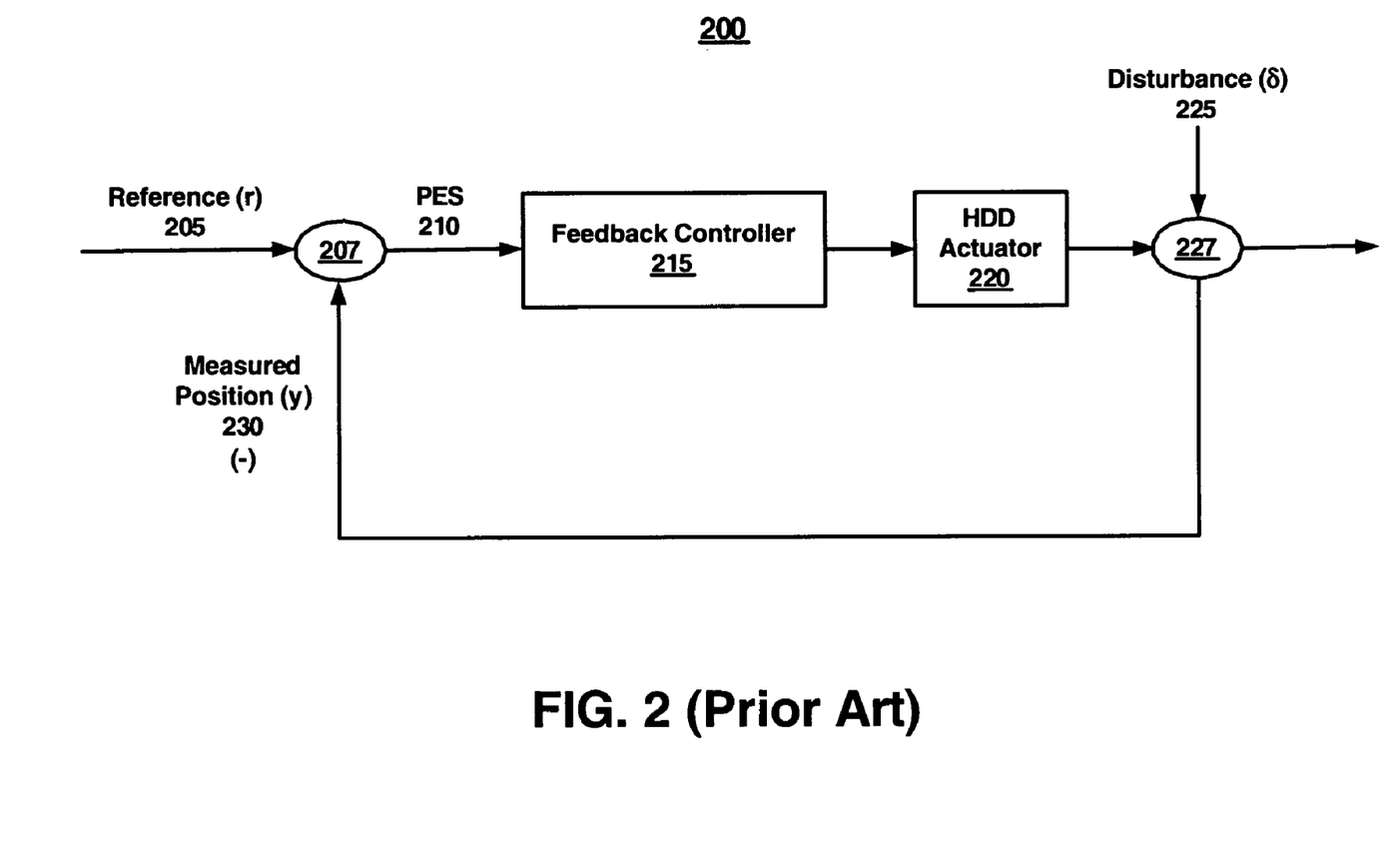
FIG. 2 is a block diagram of a conventional position error signal feedback loop.

This is illustrated in Prior Art FIG. 2. Prior Art FIG. 2 is a block diagram of a conventional feedback loop for compensating for position errors on a disk. A disturbance 225 occurs that affects the position of the hard disk drive actuator 220 at junction 227. This disturbance results in measured position 230 of the HDD actuator. Reference position signal 205 joins measured position signal 230 containing a position error created by disturbance 225 at junction 207. These signals become a position error signal (PES) 210 and enter feedback controller 215 which adjusts the signal to hard disk drive actuator 220 to compensate for disturbance 225. The feedback controller 215 design may include peak filters as described previously. This typical feedback loop does nothing to prevent the disturbance 225 from having an initial impact, but tries to compensate for the disturbance after its effects appear in the PES. The feedback loop does work to minimize the effects of the disturbance. However, it is generally not able to provide sufficient positioning accuracy in the presence of head-to-disk contact-induced disturbances, especially in the case where the disturbance frequency is above the bandwidth of the feedback system. For large amounts of track misregistration that might occur from head-to-disk contact, this conventional feedback loop is inadequate.

SUMMARY

A method and apparatus for compensating for head-to-disk contact-induced disturbances in a hard disk drive is disclosed. Embodiments of the method include determining topographical variations across a surface of a disk during the manufacturing or operation of the hard disk drive. Error signal variations that occur as a result of head-to-disk contact-induced disturbances resulting from the topographical variations are recorded. Current to a voice coil motor in the hard disk drive is varied to correct for the contact-induced disturbances before they occur, based on information from disturbances on previous revolutions.

BRIEF DESCRIPTION OF THE DRAWINGS

Prior Art FIGS. 1A–1D together illustrate head-to-disk contact and track misregistration due to topographical irregularities on a disk surface.

Prior Art

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. Furthermore, in the following detailed description, numerous specific details are set forth in order to provide a thorough understanding of the present invention. In other instances, well known methods, procedures, and components have not been described in detail so as not to unnecessarily obscure aspects of the present invention.

Certain portions of the detailed descriptions of embodiments of the invention, which follow, are presented in terms of processes and methods. Although specific steps are disclosed herein describing the operations of these processes and methods, such steps are exemplary. That is, embodiments of the present invention are well suited to performing various other steps or variations of the steps recited in the processes and methods herein.

Figure 3:
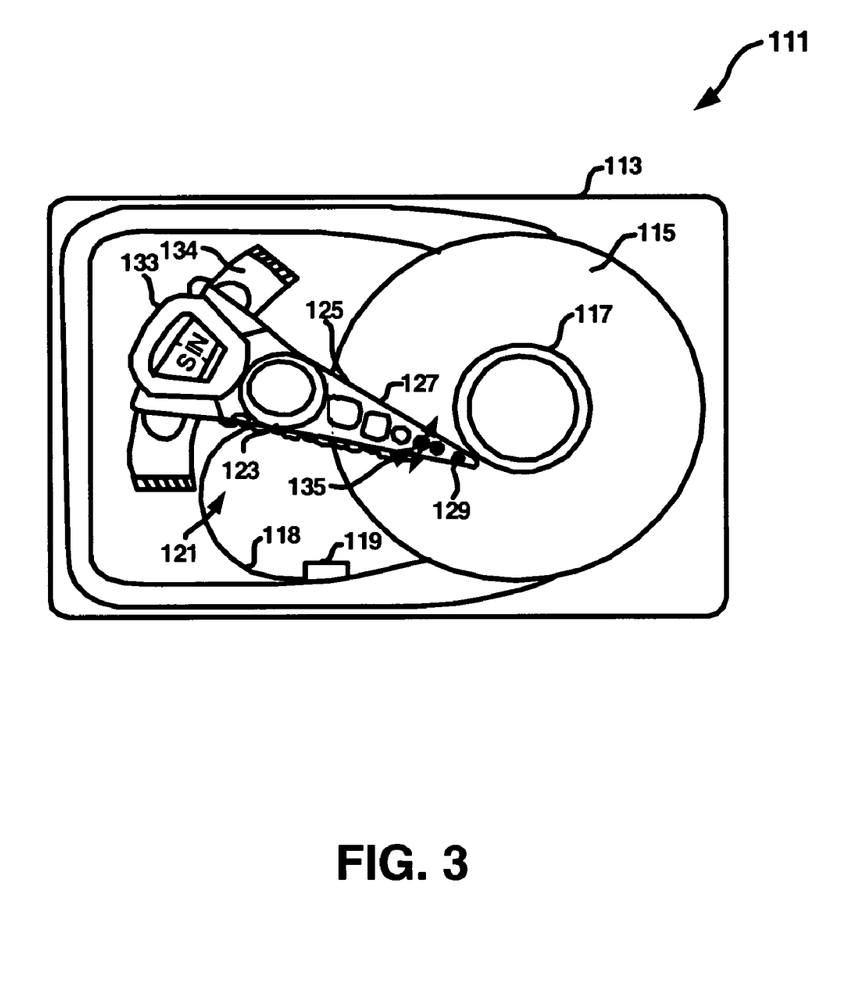
FIG. 3 is a schematic drawing of a magnetic hard disk drive or file for storing data, in accordance with an embodiment of the present invention.

FIG. 3 is a schematic drawing of one embodiment of a magnetic hard disk drive (HDD) or file 111 for storing data, in accordance with the present invention. File 111 has an outer housing or base 113 containing a disk pack having at least one media or magnetic disk 115. A spindle motor assembly having a central drive hub 117 rotates the disk or disks 115. An actuator 121 comprises at least one actuator arm 125 that is movably or pivotally mounted to base 113 about a pivot assembly 123. In another embodiment, there may be a plurality of actuator arms 125 mounted in parallel in the form of a comb.

In the embodiment shown, each arm 125 has extending from it at least one suspension 127. A suspension consists of a loadbeam, a flexure and set of leads for head signals. A magnetic read/write transducer or head is mounted on a slider 129 and the slider is secured to a flexure that is flexibly mounted to each suspension 127. The read/write heads magnetically read data from and/or magnetically write data to disk 115. The level of integration called the head gimbal assembly is the suspension 127 and the slider 129. The slider 129 is usually bonded to the end of suspension 127.

The suspension 127 has a spring-like quality, which biases or presses the air-bearing surface of the slider 129 against the disk 115 to cause the slider 129 to fly at a precise distance from the disk. The suspension 127 has a hinge area that provides for the spring-like quality, and a flexing interconnect that supports read and write traces through the hinge area. A voice coil 133, free to move within a conventional voice coil motor magnet assembly 134 (top pole not shown), is also mounted to arms 125 opposite the head gimbal assemblies. Current to the voice coil motor can be varied, according to an embodiment of the present invention, based on an error signal, such as a position error signal, to compensate for topographical variations across the surface of disk 115. Movement of the actuator 121 (indicated by arrow 135) causes the head gimbal assemblies to move along radial arcs across tracks on the disk 115 until the heads settle on their set target tracks. The head gimbal assemblies operate in a conventional manner and are designed to move in unison with one another, unless file 111 uses multiple independent actuators (not shown) wherein the arms can move independently of one another.

Figure 4A:
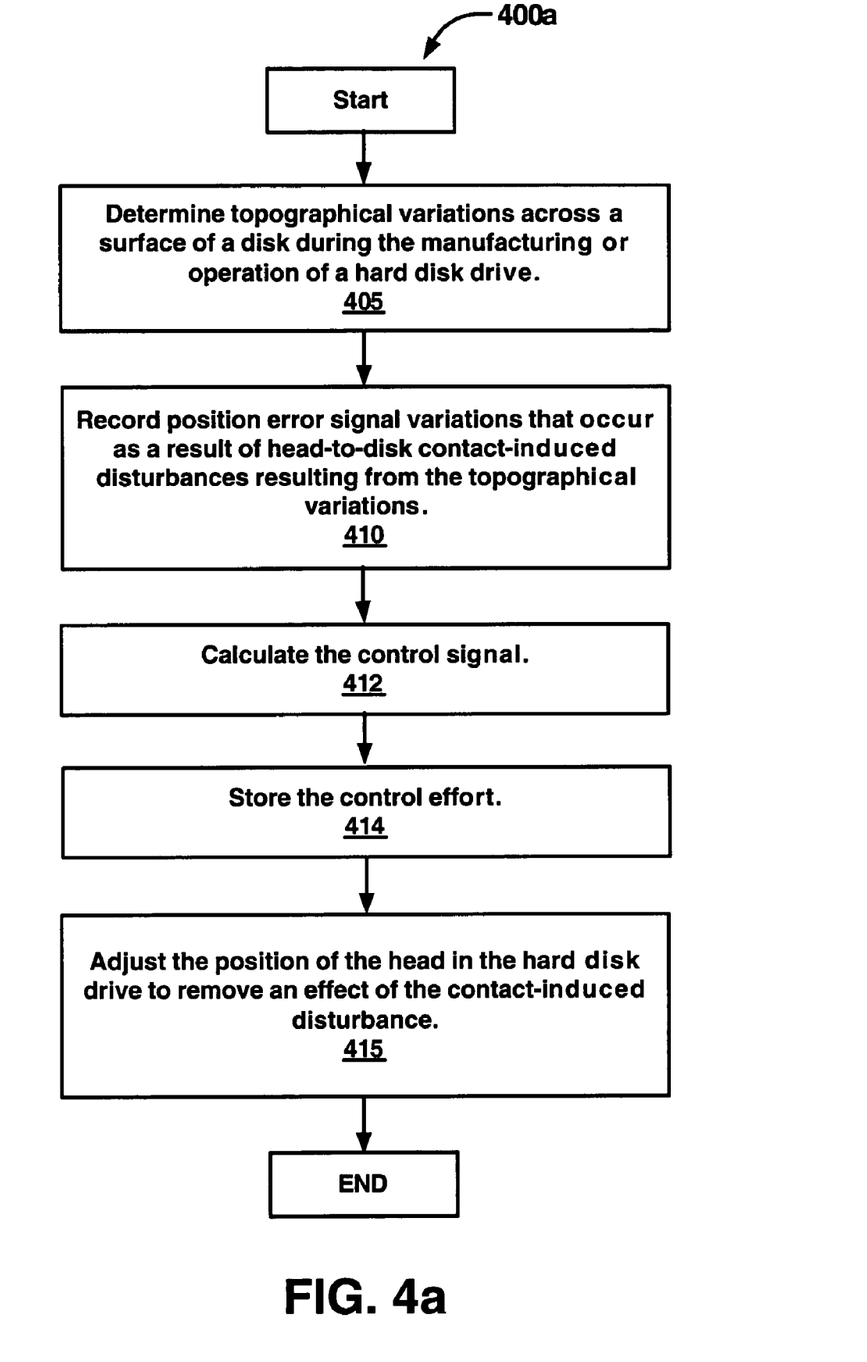
FIG. 4A is a flow diagram of a method for rejecting head-to-disk contact-induced errors, in accordance with an embodiment of the present invention.

FIG. 4A is a flow diagram of a method 400a for rejecting head-to-disk contact-induced errors in an HDD, in accordance with an embodiment of the present invention.

At step 405, according to one embodiment, topographical variations across a surface of the disk are determined during the manufacturing or operation of the HDD. These topographical variations may be ridges caused by disk clamping, slight warping of the disk, or any topographical irregularities formed on the surface of the disk during its fabrication. These variations can cause contact between the head and the disk, leading to disturbances that may result in track miss-registration during operation of the disk drive and thus interrupt the disk drive read/write operations.

At step 410 of method 400, position error signal (PES) variations that occur as a result of said head-to-disk contact-induced disturbances resulting from the topographical variations are recorded, in accordance with one embodiment of the present invention. In one embodiment, the PES can be recorded for one, for various or for all of the heads in the HDD. In another embodiment, the PES may also be recorded for various radial positions or zones across the surface of the disk. In yet another embodiment, the atmospheric pressure within the HDD may also be varied to simulate various ambient atmospheric operating conditions under which the HDD can be expected to operate. This is of particular importance for HDDs used in mobile devices that might be transported onto airplanes, or from deserts to mountaintops, for example. The recorded PES values can then be modeled as force disturbances for input into a feed-forward controller to anticipate and reject the errors due to disk topography prior to their occurrence.

At step 412 of method 400a, a calculation is performed to establish the control signals necessary to compensate for the effects of the head-to-disk contact-induced disturbance. In one embodiment, the calculations are similar to those described in the description of method 400b. Additionally, at step 414, one embodiment stores the control efforts to memory.

At step 415 of method 400a, the placement of the head is adjusted to correct for deleterious conditions resulting from contact-induced disturbances. The adjustment of the head placement may, according to one embodiment, be made by varying the current of a voice coil motor in the HDD to correct for the contact-induced disturbances before they can affect the position of the read/write head. This can be performed in conjunction with the standard PES feedback loop when a feed-forward controller signal is added to the feedback loop output and the modeled force disturbances are provided to the feed-forward controller.

Figure 4B:
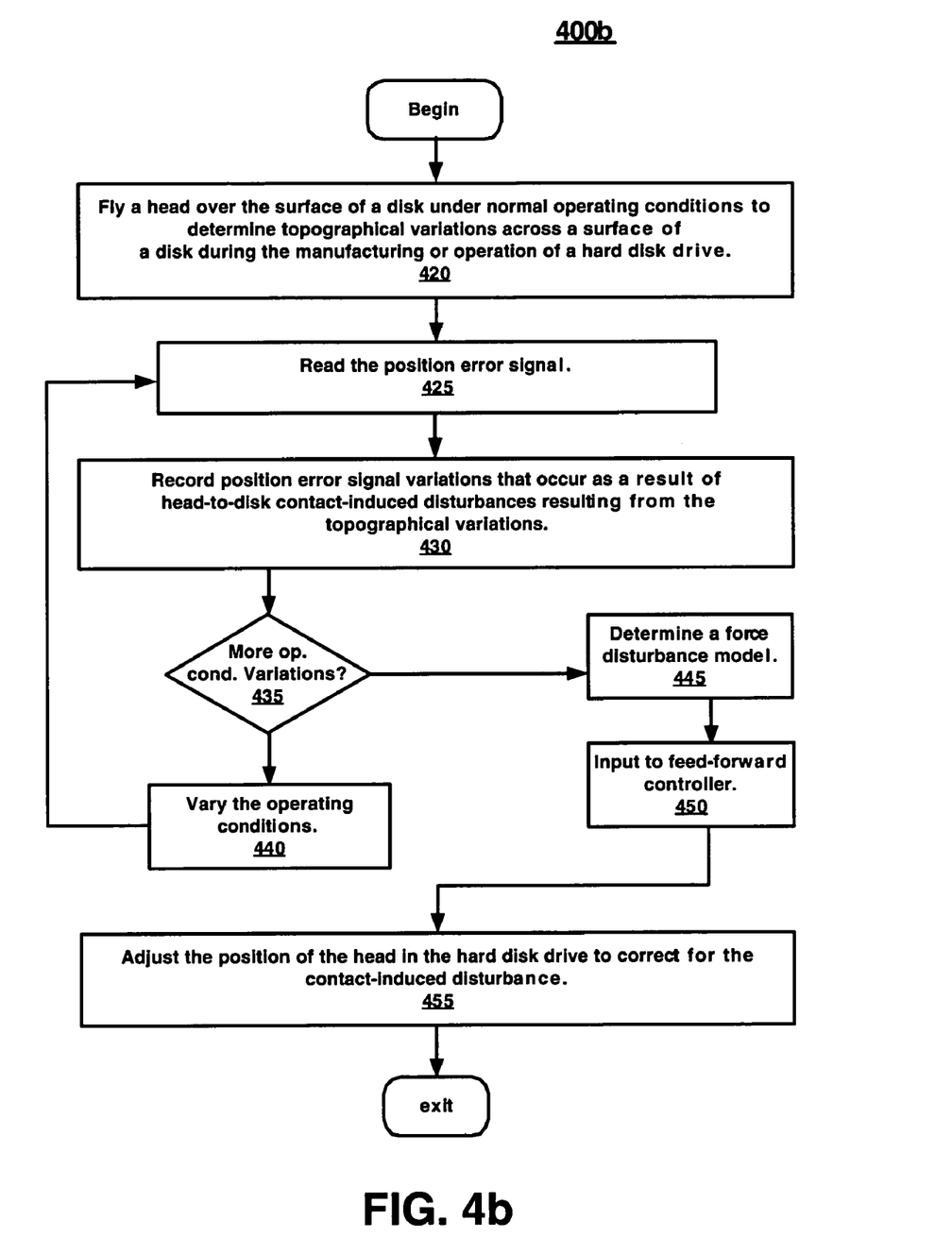
FIG. 4B is a flow diagram of a method for rejecting head-to-disk contact-induced errors, in accordance with another embodiment of the present invention.

FIG. 4B is a flow diagram of a method 400b for rejecting head-to-disk contact-induced errors, in accordance with embodiments of the present invention. At step 420, the topographical variations across the surface of the disk are determined by flying a head over the surface of the disk under normal operating conditions and reading the PES, during the manufacturing or operation of an HDD.

At step 425 of method 4*b*, the PES variations are read by at least one head of the HDD.

At step 430, the PES variations that occur as a result of head-to-disk contact-induced disturbances resulting from topographical variations are recorded, according to an embodiment of the present invention. Operating conditions can be varied to obtain PES variations for the same disk surface under different conditions. In one embodiment, the PES variations may be recorded for a plurality of heads. In another embodiment, the PES variations may be recorded for a plurality of radial positions, or zones, on the disk. In yet another embodiment, the PES variations may be recorded for a plurality of atmospheric pressures. Once all the necessary data is recorded for the various operating conditions, the data can then be used to simulate various force disturbances, as shown in step 445 below.

At step 445 of method 400*b*, the contact-induced disturbances, as determined from the recording of the PES variations, or disturbances, are modeled as force disturbances, in accordance with an embodiment of the present invention. More details of one embodiment of the modeling of the disturbances are given below in conjunction with FIG. 5.

At step 450, the force disturbance is input to a feed-forward controller, in accordance with one embodiment. The feed-forward controller can then use the disturbance model for rejecting the contact-induced disturbances that result from topographical variations. The feed-forward controller may be a basis function repetitive feed-forward controller model, or any type of feed-forward controller that can operate to use a force disturbance model and determine compensations for the force disturbances. The basis function repetitive feed-forward controller is discussed in more detail below, in conjunction with FIGS. 6 and 7.

At step 455, in accordance with an embodiment of the present invention, the feed-forward controller of the feedback loop rejects the contact-induced disturbances by adjusting the position of the head. That is, in one embodiment, the feed-forward controller provides head adjustments that anticipate the coming disturbance and compensate for the disturbance with a head position adjustment prior to the disturbance adversely affecting the position of the read/write head. That is, this adjustment may be accomplished by varying current to a voice coil motor (VCM) assembly (e.g., VCM assembly 134 of FIG. 3) in the HDD, according to one embodiment. According to another embodiment, it may be accomplished by varying the control signal to a secondary actuator, such as a MEMS (microelectromechanical system) microactuator or a piezoelectric milliactuator. Method 400*b* is then exited, although, in some embodiments, the feed forward control may still run continuously as long as the drive is in operation, in some form of error recovery mode, when the PES is measured to be excessively large, and/or in conjunction with a pressure or fly height sensor.

Figure 5:
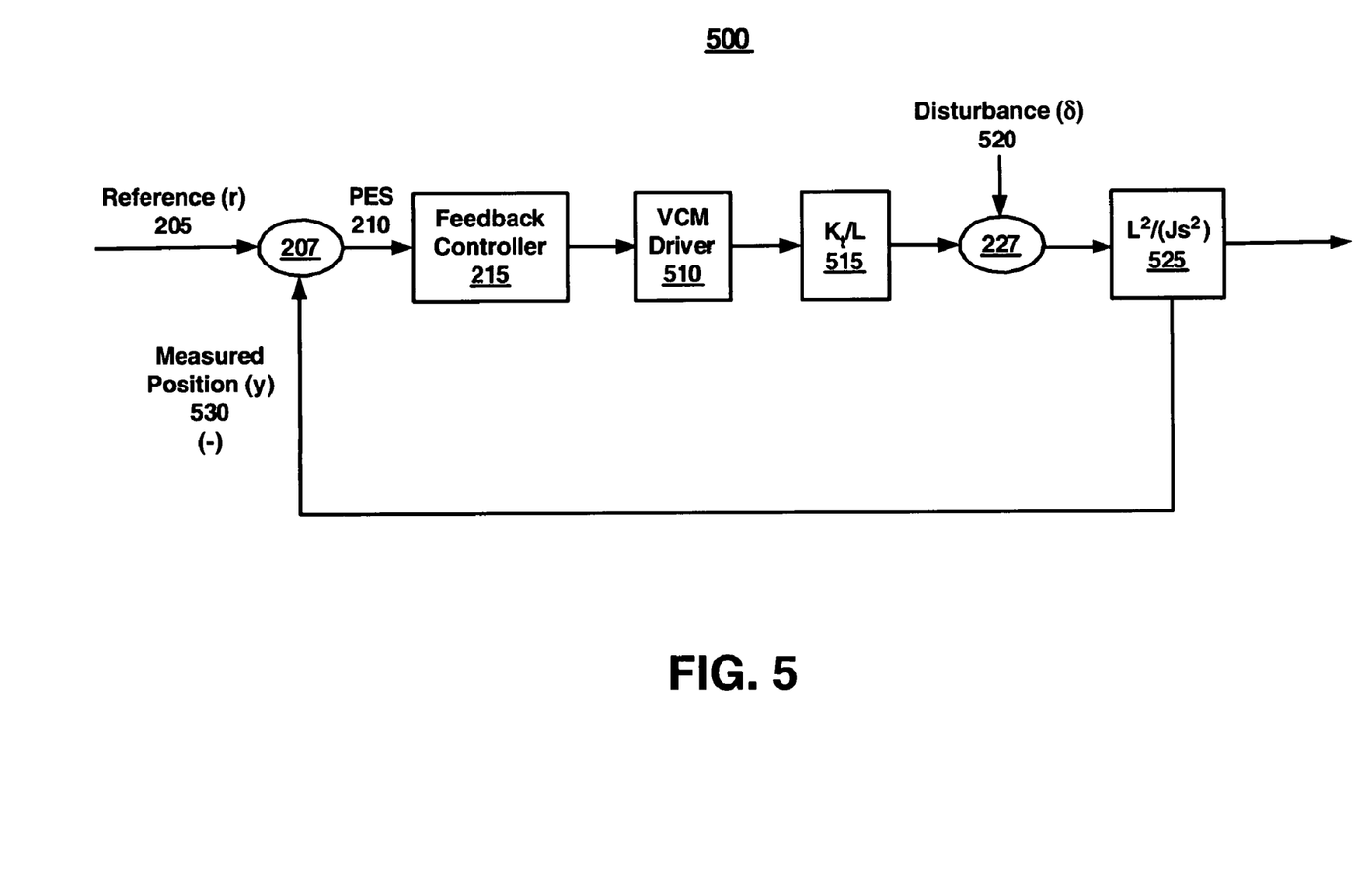
FIG. 5 is a block diagram of a force disturbance model, in accordance with an embodiment of the present invention.

FIG. 5 is a block diagram of a force disturbance model, in accordance with an embodiment of the present invention. In one embodiment, the force disturbance model uses disturbance measurements based on PES variations for various operating conditions. In other words, the PES is measured and used to calculate estimates of the disturbances. For example, the head is flown over the spinning disk and the PES variations are recorded for the various conditions. The following is a description of an example of disturbance measurements that were taken to generate a force disturbance model. Although the force disturbance model is the embodiment described, a force disturbance model is not the only method. In another embodiment, a velocity model may be used. In yet another embodiment, a model may be based on both force and velocity.

Disturbance Measurements

In order to model the force disturbances, a number of disturbance measurements are recorded according to one exemplary embodiment of the present invention. There are numerous other examples that are within the scope of the present invention, e.g. velocity, and the like. The following description is merely one exemplary situation where the invention may be utilized and is provided for purposes of clarity. For a first set of measurements, the standard feedback controller in a HDD is used during track following operations. In one embodiment, the HDD is a Mobile HDD that typically has lighter actuators that may be more susceptible to contact-induced disturbances than desktop and server HDDs. However, in another embodiment, the HDD may be of a type other than a Mobile HDD, for example a Desktop HDD or a Server HDD, which typically have heavier actuators.

PES Characteristics with Decreasing Pressure

Typical behavior is observed for repeatable runout (RRO) and for non-repeatable runout (NRRO) as a function of pressure. A "double hump" was present for the RRO on measurements from multiple mobile HDDs, although the pressures at which the humps occurred varied somewhat between different HDD models. As the pressure is decreased, the first hump, i.e. a range of pressures with an associated increase in PES, appears in which the RRO accounts for most of the total error and the NRRO is relatively small. This may be because only a single head is in contact, or because only the trailing edge of the slider is in contact. As the pressure is decreased further, the second hump occurs and the NRRO becomes significant. This may be due to multiple heads being in contact or because the front of the slider has also come into contact with the disk.

According to one embodiment, the PES resulting from the disturbances at the first hump can be very repeatable. This repeatability is consistent with disturbances that are fixed to the disk and are encountered on each revolution.

The PES power spectra for the mobile HDD were also measured. The disturbance effects appeared mainly at the harmonics of the spindle rotation. The data has contact effects at significantly higher frequencies than the open loop bandwidth of approximately 400 Hz for the exemplary mobile HDD tested.

Table 1 below shows typical PES measurements at 1.0 atm and 0.4 atm for each of the three heads of the HDD at the outer diameter (OD), middle diameter (MD), and inner diameter (ID) of the disk according to one embodiment of the present invention. The PES of the different heads is comparable, although head 1 at the OD for 0.4 atm has a somewhat lower PES than the other heads. Both the ID and MD measurements show relatively small increases in PES at 0.4 atm. However, at the OD, the PES increase was quite large for 0.4 atm. The larger PES increase at the OD was due to a combination of slider skew effects, the slider flying behavior, and the disk material and mechanical characteristics.

TABLE 1

PES for Varying Heads, Pressures, and Radial Positions

| Head | Pressure (atm) | OD (counts) | MD (counts) | ID (counts) |
|---|---|---|---|---|
| 0 | 1.0 | 5.89 | 6.65 | 7.05 |
| 0 | 0.4 | 16.81 | 7.80 | 7.43 |
| 1 | 1.0 | 4.49 | 5.36 | 5.54 |
| 1 | 0.4 | 10.61 | 6.27 | 6.32 |
| 2 | 1.0 | 6.07 | 5.74 | 6.60 |
| 2 | 0.4 | 16.31 | 6.39 | 7.30 |

Contact Force Disturbance Simulations

Referring now to FIG. 5, an exemplary model feedback loop 500 used to generate a contact force disturbance model is shown. Feedback loop 500 has a feedback controller 215 that receives a position error signal 210 comprised of reference position (e.g., r) 205 and read/write head position (e.g., y) 530. Feedback controller 215 then adjusts the input signal to the voice coil motor (VCM) driver 510 for adjusting the current to the VCM.

In one embodiment, the contact-induced disturbance is a force disturbance, represented by disturbance (e.g., δ) 520. The variable $K_t$ of term $K_t/L$ 515 represents the torque constant of the actuator voice coil motor. A transfer function such as $L^2/(Js^2)$ 525 is used between the disturbance force δ 520 and the read/write head position γ 530, where L is the length of the actuator arm, J is the moment of inertia of the actuator arm, and s is the Laplace transform variable. In another embodiment, the model is inverted to calculate the force from the measured PES 210. Because of the double integrator, an approximation is used for the inversion operation.

As an example of operation, The PES 210 measurements were taken for 1.0 atm and for 0.4 atm (see Table 1) on an exemplary hard disk drive. The corresponding disturbance force levels were found to be less than 50 mg-f at 1.0 atm and up to 200 mg-f at 0.4 atm. The calculated force values were then used with the original model to calculate the PES as a check on the error due to the model inversion approximation. It has been shown that there is minimal error due to the inversion approximation between the measured and calculated PES.

Figure 6:
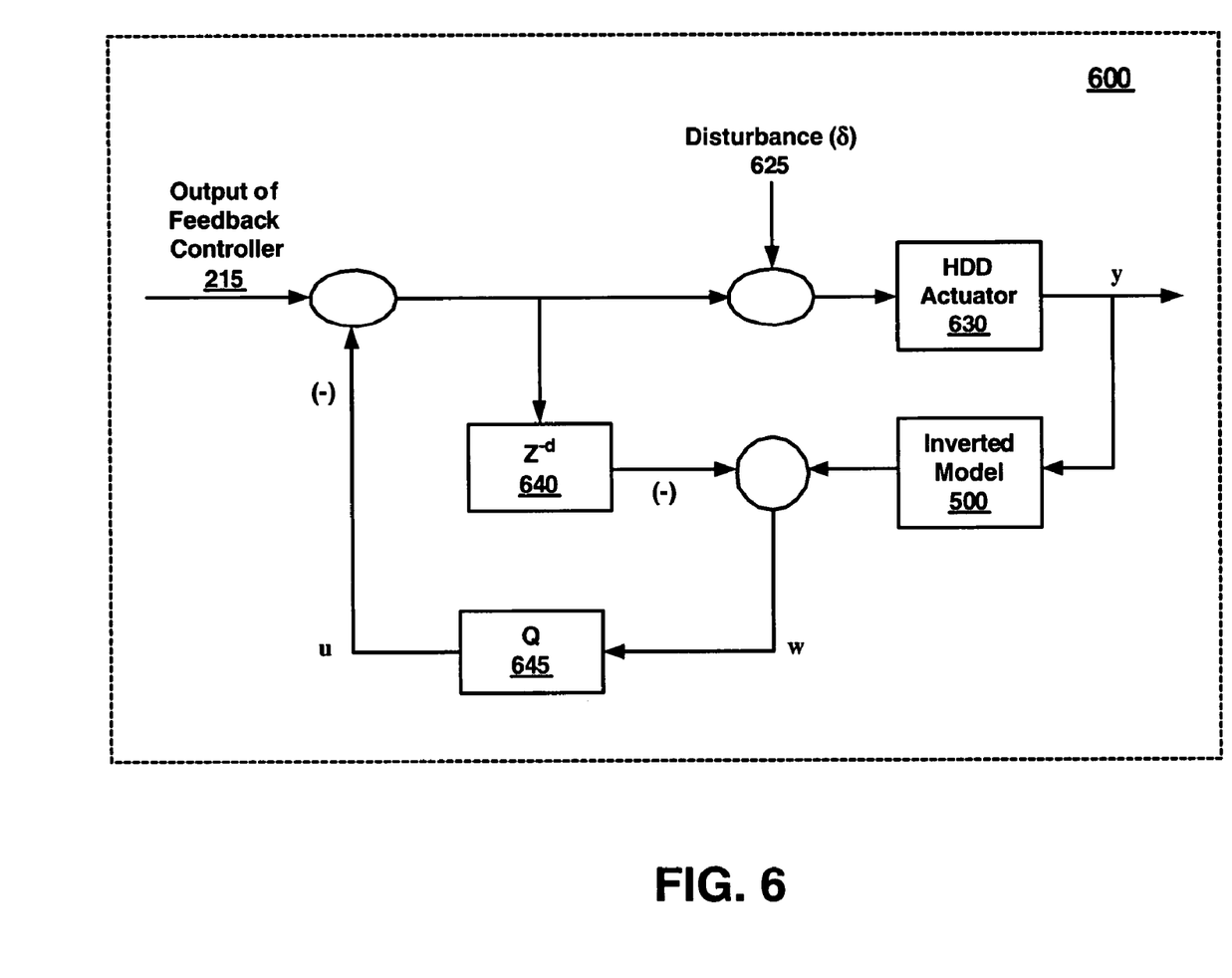
FIG. 6 is a block diagram of a system to determine an appropriate feed-forward controller, in accordance with an embodiment of the present invention.

With reference now to FIG. 6, a block diagram of a repetitive controller 600 is shown in accordance with an embodiment of the present invention. In general, the Repetitive Controller technique presented below will concentrate on the fly-height region where the repetitive runout (RRO) is large and the non-repetitive runout (NRRO) is virtually unchanged. The NRRO disturbances are broadband and are difficult to compensate without increased controller bandwidth. In addition, conventional sliders are not designed for the large contact forces that exist at the very low pressures at which the NRRO disturbances appear, and the excessive wear could result in failure of the HDD.

As mentioned above, the PES was largest at the outer diameter (OD) zone of the disk. Other types of disturbances are also often largest at the OD, such as disk and arm flutter. The Repetitive Controller was found to be effective at all radial locations. However, the results presented will concentrate on the OD for purposes of brevity and clarity.

In general, Repetitive Controllers use models of the disturbances in order to generate cancellation signals. Repetitive Controllers feed the cancellation signal into the control input at future revolutions, so they only work on repetitive disturbances. There are two main classifications of Repetitive Controllers: External Model Principle and Internal Model Principle. External Model Principle Repetitive Controllers generate an estimate of the disturbance effect that is external to the feedback loop, and are therefore generally not subject to Bode Integral Theorem constraints. Internal Model Repetitive Controllers and generate periodic signals within the feedback loop that essentially increase the gain at the repetitive disturbance frequencies. They are subject to Bode Integral Theorem constraints, so disturbance rejection at other frequencies may suffer. Repetitive Controllers are known in the art, such as described in C. Kempf et al., "Comparison of Four Discrete-Time Repetitive Control Algorithms," *IEEE Control Systems Magazine*, vol. 13, issue 6, December 1993, pp. 48–54.

Basis Function Repetitive Controller

The present embodiment shows a Basis Function External Model Principle Repetitive Controller 600 being implemented in accordance with one embodiment of the present invention. However, it is understood that any repetitive controller that can be implemented as a feed-forward controller, based on an input model that models contact-induced disturbances, might be implemented. This technique model requires more calculation time than some other Repetitive Controller types, and the calculation time scales approximately with the number of harmonics to be cancelled. However, the calculations are similar to operations that are already performed in many HDD controllers, so an efficient combination with existing code may be possible. One embodiment allows for selective compensation of particular harmonics, which may improve performance compared to Repetitive Controller types that are not selective. Moreover, it will act as a feed-forward controller once it has converged, so that the feedback loop is virtually unaffected. This avoids the amplification of disturbances at other frequencies that could occur with a modification of the feedback loop.

In one embodiment, the Basis Function Repetitive Controller 600 uses an inverted model 500 of the plant P ($z^{-1}$) 630, e.g. the HDD actuator, to estimate the disturbance and is represented by the block diagram shown in FIG. 6. In the case that the plant has zeros that cannot be inverted, an inversion approximation technique may be used, such as is known in the art. In FIG. 6, according to an embodiment of the present invention, the plant is modeled by $$P(z^{-1}) = \frac{z^{-d}B(z^{-1})}{A(z^{-1})} \quad (1)$$

where $z^{-1}$ is a single-step delay and $z^{-d}$ 640 represents the number of pure delay steps in the plant.

In general, the Basis Function Repetitive Controller 600 represents the estimate of the repetitive disturbance δ 625 at time k as a linear combination of basis functions such as $$\delta(k) = \sum_i [a_i \cos(\omega_i k) + b_i \sin(\omega_i k)] \quad (2)$$

where $$\omega_i = \frac{2\pi i}{NT_s} \quad (3)$$

and where $NT_s$ is the fundamental harmonic, $T_s$ is the sampling period, and the index i is selected for the desired harmonics to be rejected. The coefficients of the basis functions $a_i$ and $b_i$ are calculated adaptively using $$\theta(k) = \theta(k-1) + \frac{\beta\phi(k-d)\varepsilon(k)}{1 + \beta\phi^T(k-d)\phi(k-d)} \quad (4)$$

where q(k) is the vector of basis function coefficients, $f(k-d)$ is the vector of basis functions, and b is the adaptation gain. The error between the actual disturbance input and the estimated disturbance is given by $$\varepsilon(k) = w(k-d) - \theta^T(k-1)\phi(k-d). \quad (5)$$

Note that for this case, $f^T(k-d)f(k-d)$ is a constant, which speeds computation of Eqn. (4). The Repetitive Control is then given by $$u(k) = \theta^T(k)\phi(k). \quad (6)$$

For the Basis Function Repetitive Controller 600 of FIG. 6, according to an embodiment of the present invention, the Q-filter 645 includes the calculation of e(k) in Eqn. (5), the coefficient update law of Eqn. (4), and the calculation of the Repetitive Control signal u(k) in Eqn. (6).

Figure 7:
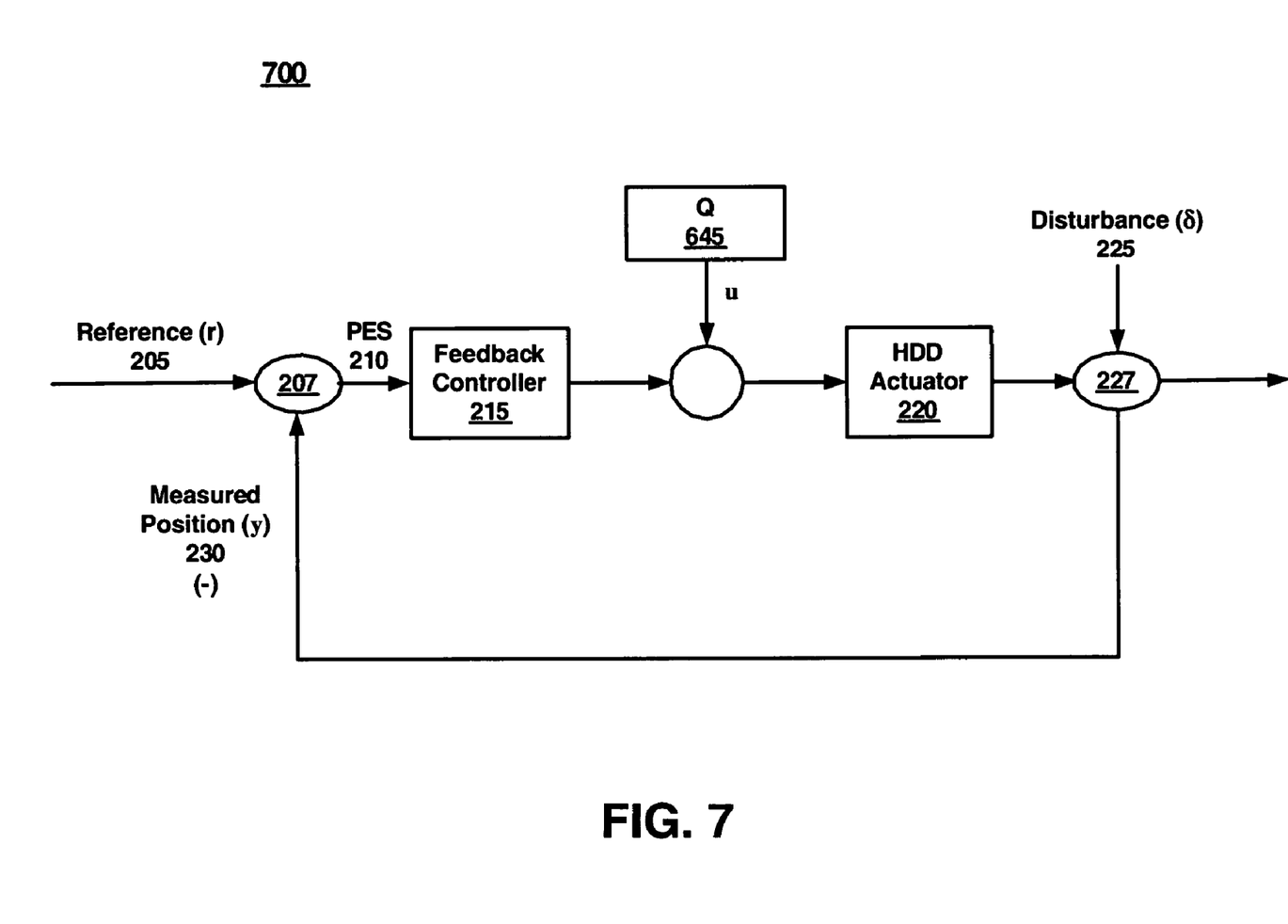
FIG. 7 is a block diagram of a feedback loop having a feed-forward controller for rejecting contact-induced errors, in accordance with an embodiment of the present invention.

FIG. 7 is a block diagram 700 of a feedback loop (e.g., feedback loop 200 of FIG. 2) having a Repetitive feed-forward controller 600 for rejecting contact-induced errors, in accordance with an embodiment of the present invention. In one embodiment, to compensate for additional disturbances that occur at lower fly-heights, Repetitive Controller 600 is added to the standard HDD feedback controller, such as feedback controller 200 of Prior Art FIG. 2. That is, it may be implemented as an "add-on" controller, such that the existing feedback control structure 200 remains unchanged and the Repetitive Controller 600 is added to the existing structure. Therefore, the ability to use the existing feedback structure augmented with an additional repetitive controller 600 for an HDD application provides the utilization of the repetitive controller 600 with legacy HDD applications.

In one embodiment, Repetitive Controller 600 was implemented on a digital signal processor (DSP). For example, a mobile HDD was operated in its normal track-following mode and the Repetitive Controller signal was added to the standard feedback controller signal. No changes were required for the standard feedback controller design, although the peak filter of the original controller at the fundamental spindle harmonic was removed with the addition of the Repetitive Controller.

Repetitive Controller 600 is found to be very effective in rejecting the contact-induced disturbances if the proper quantity and frequency of spindle harmonics are targeted. From a practical standpoint, the harmonics could be determined as part of the HDD manufacturing or recalibration process. With a sufficient (potentially large) number of harmonics, the PES at 0.4 atm can be reduced to nearly the level at 1.0 atm for the original controller.

PES power spectrum peaks can be eliminated by Repetitive Controller 600 up to at least 1120 Hz, which is well beyond the 400 Hz open loop bandwidth of the exemplary mobile HDD. The original controller has a peak filter at the fundamental harmonic of 70 Hz to compensate for the standard RRO components. The peak filter also works well for the contact-induced disturbances at 70 Hz, and no peak occurs in the power spectrum at this frequency, even for the case with the original controller. The results were measured on a single drive. However, subsequent implementation on additional HDDs showed comparable behavior.

Figure 8:
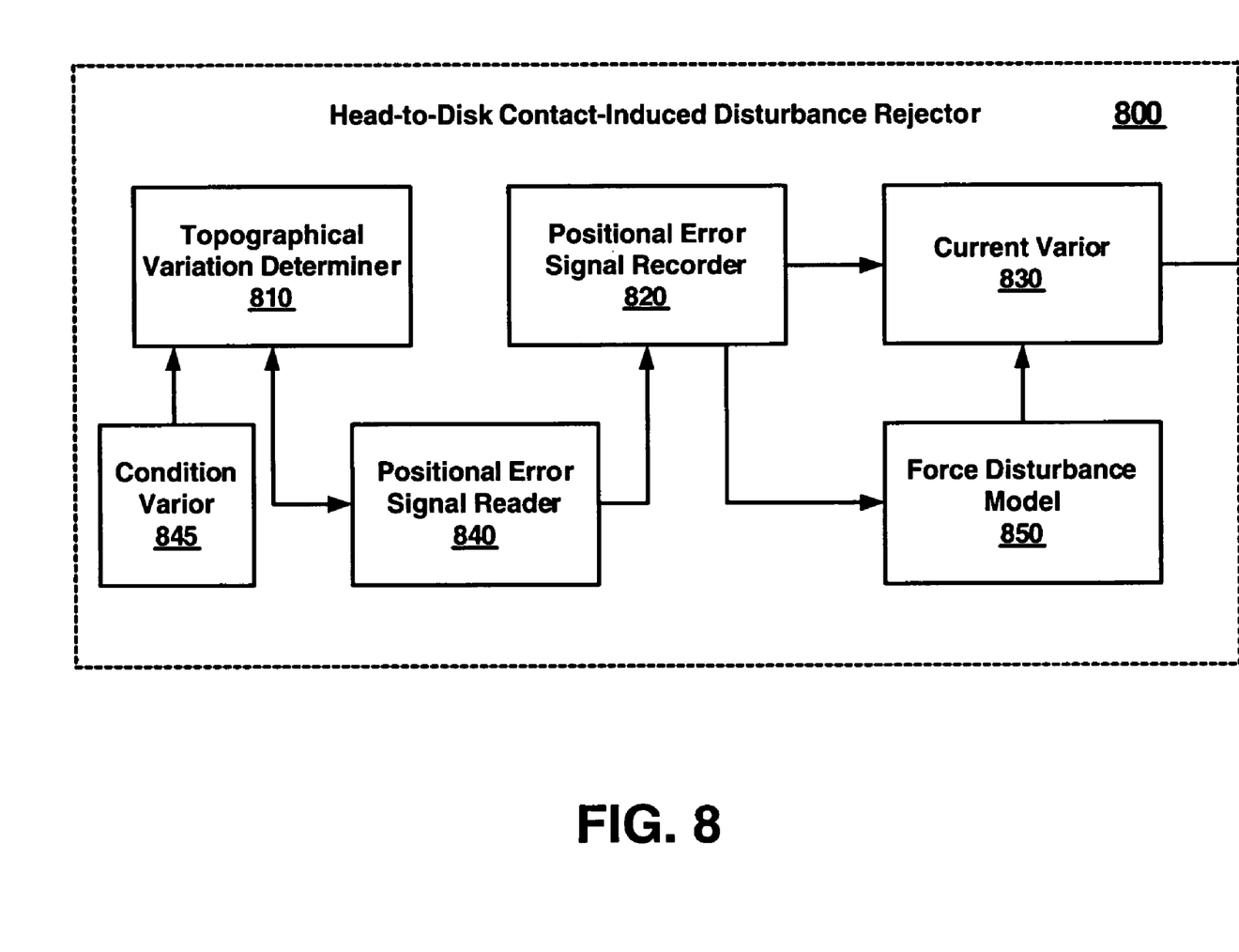
FIG. 8 is a block diagram of a head-to-disk contact-induced disturbance rejector, according to an embodiment of the present invention.

FIG. 8 is a block diagram of a head-to-disk contact-induced disturbance rejector 800, according to an embodiment of the present invention. Head-to-disk contact-induced disturbance rejector 800 includes a topographical variation determiner 810 for determining topographical variations across a surface of a disk (e.g., disk 115 of FIG. 3) during the manufacturing or operation of a hard disk drive (e.g., hard disk drive 111 of FIG. 3). Details of the topographical variation determining means 810 can be found in conjunction with FIGS. 4A and 4B above. For example, in one embodiment, determining the topographical variations across said surface of said disk includes flying a head over the surface of the disk under normal operating conditions and reading the position error signal.

According to one embodiment, head-to-disk contact-induced disturbance rejector 800 has a position error signal recorder 820 coupled to topographical variation determiner 810 for recording position error signal variations that occur as a result of head-to-disk contact-induced disturbances.

According to one embodiment, head-to-disk contact-induced disturbance rejector 800 includes a current varior 830 that is coupled to position error signal recorder 820 for varying current to a voice coil motor (VCM), such as VCM 134 of FIG. 3. The varying current to a VCM is for compensating for head-to-disk contact-induced disturbances that occur as a result of topographical variations on the surface of a disk. Current varior may be a feed-forward controller (e.g., a basis function repetitive feed-forward controller 600 as described in conjunction with FIG. 6 above), according to one embodiment of the present invention.

The head-to-disk contact-induced disturbance rejector 800 also includes a condition varior 845 coupled to topographical variation determiner 810 for varying operational conditions, according to an embodiment of the present invention. The operational conditions that are varied may include, in one embodiment, atmospheric pressure. In another embodiment, the operational conditions that are varied may be the radial area or zone of the disk. In yet another embodiment, the head used for determining topographical variations by topographical variation determiner 810 may be varied. In other embodiments, any operational conditions that can help to establish a contact force disturbance model 850 may be varied by condition varior 845.

Head-to-disk contact-induced disturbance rejector 800 also includes a position error signal reader 840 coupled to topographical variation determiner 810 and position error signal recorder 840 for reading the position error signal for the various operational conditions.

Head-to-disk contact-induced disturbance rejector 800 includes a force disturbance model 850 coupled to position error signal recorder and current varior 830. Force disturbance model 850 is modeled from recorded position error signals for topographical variations on the surface of a disk as recorded under various operational conditions. Current varior 830 then varies the current to a VCM in the HDD based upon force disturbances model 850, thus rejecting contact-induced disturbances prior to their occurrence.

Thus, the present invention provides, in various embodiments, a method and apparatus for rejecting contact-induced disturbances in a hard disk drive. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for rejecting head-to-disk contact-induced disturbances in a hard disk drive, said method comprising:
   determining topographical variations across a surface of a disk during the manufacturing or operation of said hard disk drive;
   recording error signal variations that occur as a result of said head-to-disk contact-induced disturbances resulting from said topographical variations; and
   adjusting a position of a head in said hard disk drive to remove an effect of said contact-induced disturbances, wherein said adjusting is performed by varying a current to a voice coil motor based upon a force disturbances model.

2. The method as recited in claim 1, wherein said determining said topographical variations across said surface of said disk further comprises:
   flying a head over said surface of said disk under normal operating conditions; and
   reading said error signal.

3. The method as recited in claim 2, wherein said recording said error signal variations further comprises:
   recording said error signal variations for a plurality of heads.

4. The method as recited in claim 3, wherein said recording said error signal variations further comprises:
   recording said error signal variations for a plurality of radial positions on said disk.

5. The method as recited in claim 3, wherein said recording said error signal variations further comprises:
   recording said error signal variations for a plurality of atmospheric pressures.

6. The method as recited in claim 3 wherein said recording said error signal variations further comprises:
   modeling said contact-induced disturbances, as determined from said recording of said error signal variations, as said force disturbances model.

7. The method as recited in claim 6 wherein said modeling of said contact-induced disturbances, as determined from said recording of said error signal variations, as said force disturbances model further comprises:
   supplying said force disturbances model to a feed-forward controller.

8. The method as recited in claim 1 wherein said varying said current further comprises:
   performing said varying in conjunction with a standard closed-loop feedback loop.

9. The method as recited in claim 1 wherein said adjusting said position of said head further comprises:
   performing said varying using a feed-forward controller based on said force disturbances model, wherein said adjusting removes an effect of said contact-induced disturbances before said effect can occur.

10. The method as recited in claim 9 wherein said performing said varying by said feed-forward controller further comprises:
    performing said varying by a basis function repetitive feed-forward controller.

11. A hard disk drive comprising:
    a housing;
    a disk pack mounted to said housing and having one or more disks that are rotatable relative to said housing, said disk pack defining an axis of rotation and a radial direction relative to said axis;
    an actuator mounted to said housing and being movable relative to said disk pack, said actuator having one or more heads for reading data from and writing data to said disks;
    one or more suspension assemblies coupled to said actuator, said suspension assembly comprising a slider that comprises one of said heads, wherein said suspension has a spring-like quality;
    a voice coil motor mounted to said suspension for controlling an amount of radial motion of said heads across surfaces of said disks based on an input current; and
    a control system coupled to said voice coil motor for supplying said input current to said voice coil motor based on a error signal, wherein said input signal is varied at least in part based on a force disturbance model, said control system comprising:
    a feedback controller; and
    a feed-forward controller for rejecting contact-induced errors on at least one of said heads caused by topographical variations on at least one of said disks.

12. The hard disk drive as described in claim 11, wherein said topographical variations are determined by obtaining said error signal during the manufacturing or operation of said hard disk drive.

13. The hard disk drive as described in claim 11, wherein said topographical variations are determined by obtaining a error signal for a plurality of heads.

14. The hard disk as described in claim 11, wherein said topographical variations are determined by obtaining said error signal for a plurality of radial locations on at least one of said plurality of disks.

15. The hard disk drive as described in claim 11, wherein said topographical variations are determined for a plurality of atmospheric pressures.

16. The hard disk drive as in claim 11, wherein said feed-forward controller is a repetitive controller.

17. A head-to-disk contact-induced disturbance rejector comprising:
    topographical variation determining means for determining topographical variations across a surface of a disk during the manufacturing or operation of a hard disk drive;
    error signal recording means coupled to said topographical variation determining means for recording error signal variations that occur as a result of head-to-disk contact-induced disturbances; and
    current varying means coupled to said error signal recording means for varying current to a voice coil motor for compensating for said head-to-disk contact induced disturbances, wherein said current varying means performs said varying of said current based upon a force disturbances model.

18. The head-to-disk contact-induced disturbance rejector as described in claim 17, further comprising:
    condition varying means coupled to said topographical variation determining means for varying operational conditions; and
    error signal reading means coupled to said topographical variation determining means and to said error signal recording means for reading said error signal for said varied operational conditions.

19. The head-to-disk contact-induced disturbance rejector as described in claim 18, wherein said condition varying means varies heads from among a group of available heads.

20. The head-to-disk contact-induced disturbance rejector as described in claim 18, wherein said condition varying means varies a radial position on said surface of said disk.

21. The head-to-disk contact-induced disturbance rejector as described in claim 18, wherein said condition varying means varies the atmospheric pressure in said hard disk drive.

22. The head-to-disk contact induced disturbance rejector as described in claim 17, wherein said recorded error signals are used to model force disturbances.

23. The head-to-disk contact-induced rejector as described to claim 17 further comprising:
   a control signal varying means for varying a control signal to a secondary actuator for compensating for said head-to-disk contact-induced disturbances.

24. The head-to-disk contact-induced rejector as described in claim 17, wherein said recording said error signal variations further comprise:
   recording a error signal variation.

* * * * *